United States Patent
Fermann et al.

(10) Patent No.: US 9,354,485 B2
(45) Date of Patent: May 31, 2016

(54) OPTICAL FREQUENCY RULER

(71) Applicant: IMRA AMERICA, Inc., Ann Arbor, MI (US)

(72) Inventors: Martin E. Fermann, Dexter, MI (US); Ingmar Hartl, Ann Arbor, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 175 days.

(21) Appl. No.: 13/873,869

(22) Filed: Apr. 30, 2013

(65) Prior Publication Data

US 2013/0293946 A1     Nov. 7, 2013

Related U.S. Application Data

(60) Provisional application No. 61/640,824, filed on May 1, 2012, provisional application No. 61/764,355, filed on Feb. 13, 2013.

(51) Int. Cl.
   *G02F 1/39*         (2006.01)
   *H01S 3/00*         (2006.01)
   *H01S 3/23*         (2006.01)

(52) U.S. Cl.
   CPC ................ *G02F 1/39* (2013.01); *H01S 3/0092* (2013.01); *H01S 3/2308* (2013.01); *H01S 3/2383* (2013.01)

(58) Field of Classification Search
None
See application file for complete search history.

(56) References Cited

U.S. PATENT DOCUMENTS

| | | |
|---|---|---|
| 5,177,633 A | 1/1993 | Wong |
| 6,724,788 B1 | 4/2004 | Holzwarth et al. |
| 6,785,303 B1 | 8/2004 | Holzwarth et al. |
| 6,897,959 B2 | 5/2005 | Haensch et al. |
| 7,190,705 B2 | 3/2007 | Fermann et al. |
| 7,291,839 B1 | 11/2007 | Demers et al. |
| 7,538,881 B2 | 5/2009 | Ye et al. |
| 7,649,915 B2 | 1/2010 | Fermann et al. |
| 7,809,222 B2 | 10/2010 | Hartl et al. |
| 7,995,630 B2 | 8/2011 | Rakuljic |
| 8,040,929 B2 | 10/2011 | Imeshev |
| 8,120,773 B2 | 2/2012 | Gohle et al. |

(Continued)

OTHER PUBLICATIONS

International Search Report, dated Jul. 11, 2013, PCT/US13/38752.

(Continued)

*Primary Examiner* — Hemang Sanghavi
(74) *Attorney, Agent, or Firm* — Sughrue Mion, PLLC; Richard C. Turner

(57) ABSTRACT

The present invention relates to frequency rulers. At least one embodiment includes a mode locked pump source operated at pulse repetition rate, and a pump output having a pump carrier envelope offset frequency. A nonlinear optical system outputs a frequency ruler spectrum comprising individual frequency modes. The frequency modes may be characterized by a frequency spacing which is an integer multiple of the repetition rate and by distinct ruler carrier envelope offset frequencies which exhibit at least one discontinuity across the frequency output. The ruler carrier envelope offset frequencies are substantially locked to the carrier envelope offset frequency of the pump laser. One preferred embodiment includes a frequency doubled, doubly resonant, non-degenerate OPO (DNOPO), a supercontinuum generation (SC) stage and at least one reference laser arranged downstream from a Tm fiber-based pump source. A plurality of beat signals generated therefrom provide for stabilization of the system.

35 Claims, 11 Drawing Sheets

(56) References Cited

U.S. PATENT DOCUMENTS

| | | |
|---|---|---|
| 8,120,778 B2 | 2/2012 | Fermann et al. |
| 8,120,841 B2 | 2/2012 | Sosabowski et al. |
| 2010/0060976 A1* | 3/2010 | Ebrahim-Zadeh .... G02F 1/3532 359/328 |
| 2011/0043815 A1 | 2/2011 | Giaccari et al. |
| 2011/0058248 A1* | 3/2011 | Vodopyanov ............. G02F 1/39 359/330 |
| 2011/0069375 A1* | 3/2011 | Lin et al. .................... 359/328 |
| 2011/0080580 A1 | 4/2011 | Fermann et al. |
| 2012/0133931 A1 | 5/2012 | Fermann et al. |
| 2012/0162748 A1 | 6/2012 | Fermann |
| 2012/0205352 A1 | 8/2012 | Fermann |
| 2012/0236314 A1 | 9/2012 | Fermann |
| 2012/0281720 A1 | 11/2012 | Fermann |
| 2012/0327959 A1 | 12/2012 | Fermann |
| 2014/0185635 A1* | 7/2014 | Cox et al. ..................... 372/18 |

OTHER PUBLICATIONS

F. Adler et al., "Phase-stabilized, 1.5 W frequency comb at 2.8-4.8 µm", Optics Letters, May 1, 2009, pp. 1330-1332, vol. 34, No. 9.

S. Diddams et al., "Molecular fingerprinting with the resolved modes of a femtosecond laser frequency comb", Nature, Feb. 2007, pp. 627-630, vol. 445.

A. Foltynowicz et al., "Optical frequency comb spectroscopy", Faraday Discussions, First published on the web May 12, 2011, pp. 23-31, vol. 150.

R. Gebs et al., "1 GHz repetition rate femtosecond OPO with stabilized offset between signal and idler frequency combs", Optical Express, Apr. 14, 2008, pp. 5397-5405, vol. 16, No. 8.

Kohlhaas et al., "Robust laser frequency stabilization by serrodyne modulation", Optics Letters, Mar. 15, 2012, pp. 1005-1007, vol. 37, No. 6.

N. Leindecker et al., "Octave-spanning ultrafast OPO with 2.6-6.1 µm instantaneous bandwidth pumped by femtosecond Tm-fiber laser", Optics Express, Mar. 26, 2012, pp. 7046-7053, vol. 20, No. 7.

T. Sizer, "Increase in laser repetition rate by spectral selection", IEEE Journal of Quantum Electronics, Jan. 1989, pp. 97-103, vol. 25, No. 1.

H.R. Telle et al, "Carrier-envelope offset phase control: A novel concept for absolute optical frequency measurement and ultrashort pulse generation", Appl. Phys. B 69, pp. 327-332 (recvd Aug. 19, 1999; published online Sep. 8, 1999).

* cited by examiner

OPTICAL FREQUENCY RULER

CROSS REFERENCE TO RELATED APPLICATIONS

This application claims priority to U.S. Provisional Patent Application No. 61/640,824, filed May 1, 2012, entitled "Optical Frequency Ruler". This application also claims priority to U.S. Provisional Patent Application No. 61/764,355, filed Feb. 13, 2013, entitled "Optical Frequency Ruler". The contents of Application Nos. 61/640,824 and 61/764,355 are hereby incorporated by reference in their entirety.

FIELD OF THE INVENTION

The present invention relates to optical frequency rulers for broadband coherent light sources.

BACKGROUND

In recent years interest in high resolution optical spectroscopy has increased. The following exemplary patents, published patent applications, and publications relate to light sources for precision optical frequency measurement and applications of the same in high resolution spectroscopy:

Holzwarth et al., U.S. Pat. No. 6,724,788 entitled 'Method and device for generating radiation with stabilized frequency';

Holzwarth et al., U.S. Pat. No. 6,785,303, entitled 'Generation of stabilized, ultra-short light pulses and the use thereof for synthesizing optical frequencies';

Haensch et al., U.S. Pat. No. 6,897,959, entitled "Frequency comb analysis";

Fermann et al., U.S. Pat. No. 7,190,705, entitled 'Pulsed laser sources';

Fermann et al., U.S. Pat. No. 7,649,915, entitled 'Pulsed laser sources';

Hartl et al., U.S. Pat. No. 7,809,222, entitled 'Laser based frequency standards and their applications';

Gohle et al., U.S. Pat. No. 8,120,773, entitled 'Method and device for cavity enhanced optical vernier spectroscopy';

Fermann et al., U.S. Pat. No. 8,120,778: entitled 'Optical scanning and imaging systems based on dual pulsed laser systems';

Giaccari et al. U.S. Patent Application Pub. No. 2011/0043815, entitled 'Referencing of the Beating Spectra of Frequency Combs';

Vodopyanov et al., U.S. Patent Application Pub. No. 2011/0058248, entitled 'Infrared frequency comb methods, arrangements and applications';

T. Sizer, 'Increase in laser repetition rate by spectral selection', IEEE J. Quantum Electronics, vol. 25, pp. 97-103 (1989);

S. Diddams et al., 'Molecular fingerprinting with the resolved modes of a femtosecond laser frequency comb', Nature, vol. 445, pp. 627 (2007);

R. Gebs et al., '1 GHz repetition rate femtosecond OPO with stabilized offset between signal and idler frequency combs', Opt. Express, vol. 16, pp. 5397-5405 (2008)

F. Adler et al., Phase-stabilized, 1.5 W frequency comb at 2.8 µm-4.8 µm, Opt. Lett., vol. 34, pp. 1330-1332 (2009), A. Foltynowicz et al., 'Optical frequency comb spectroscopy', Faraday Discussions, vol. 150, pp. 23-31, 2011

Kohlhaas et al., 'Robust laser frequency stabilization by serrodyne modulation', Opt. Lett., vol. 37, pp. 1005 (2012); and N. Leindecker et al., Opt. Expr., 'Octave-spanning ultrafast OPO with 2.6-6.1 µm instantaneous bandwidth pumped by femtosecond Tm-fiber laser', Opt. Expr., 20, 7046 (2012).

Advances in frequency measurement methods and systems have occurred over the past several years with the use of optical frequency combs. However, high resolution, broadband measurement in the mid-IR spectral region and beyond remains challenging.

SUMMARY OF THE INVENTION

As used herein, an optical frequency ruler refers to an optical device that generates an output spectrum of individual frequency modes $f_n$ that can be characterized by an expression $f_n = nf_{rep} + f_{00}$, where $f_{00}$ can have at least two different values across the output spectrum. Frequency combs have been defined to have an output spectrum which can be written as $f_n = nf_{rep} + f_0$, where n is an integer, $f_n$ denotes the frequencies of individual comb modes, and $f_0$ corresponds to the carrier envelope offset frequency. The frequency $f_0$ is sometimes referred to as the slip frequency, and is the same for all comb modes. Because $f_{00}$ is not necessarily unique in a frequency ruler, frequency combs are regarded as a special case of a frequency ruler. Thus, every frequency comb is also a frequency ruler, but a frequency ruler does not need to be a frequency comb.

In one aspect the present invention provides a new type of frequency ruler based on a synchronously pumped, doubly resonant, non-degenerate OPO (DNOPO), where the carrier envelope offset frequencies of both signal and idler $f_{0s}$ and $f_{0i}$ are invariant in time and can be stabilized via stabilization of the carrier envelope offset frequency of the pump source.

The pump source may comprise a mode locked laser that is constructed for operation with a fixed repetition rate and carrier envelope offset frequency.

The cavity length of the DNOPO can be synchronized to the cavity length of the pump laser via a dither lock.

Alternatively, the cavity length of the DNOPO can be synchronized by observing a beat signal between the frequency ruler generated by the DNOPO and the frequency ruler generated by the pump laser, where the beat signal is locked to an external RF reference source with a phase-locked loop.

The values of $f_{0s}$ and $f_{0i}$ can be adjusted by adjusting the amount of dispersion inside the DNOPO, by using different resonances inside the DNOPO or by changes of the DNOPO cavity length.

The frequency ruler can be used to produce well defined reference frequencies in the mid-IR spectral region for spectroscopy applications such as Fourier transform spectroscopy, IR imaging and LIDAR.

Additional possible applications in spectroscopy comprise direct comb spectroscopy as well as cavity enhanced direct spectroscopy.

The value of $f_{0s}$ or $f_{0i}$ inside the DNOPO can be measured using spurious emissions from the DNOPO.

At least one embodiment includes a frequency ruler. The frequency ruler includes a pump source having a mode locked laser. The pump source generates pump pulses at a pulse repetition rate frep and is characterized by having a pump carrier envelope offset frequency $f_0p$. The frequency ruler includes a nonlinear optical system receiving the pump pulses and producing as an output a frequency ruler spectrum comprising individual frequency modes, the frequency modes characterized by having: a frequency spacing which is an integer multiple of the repetition rate, and distinct ruler carrier envelope offset frequencies which exhibit at least one discontinuity as a function of frequency. The carrier envelope offset frequencies of the nonlinear system are passively stable and, for a given value of $f_0p$, exhibit absolute frequency fluctuations of less than 10% of frep.

At least one embodiment includes a frequency ruler. The frequency ruler includes a pump source. The pump source includes a fiber-based frequency comb laser. The pump source generates pump pulses at a pulse repetition rate and is characterized by having a pump carrier envelope offset frequency, $f_{op}$. The frequency ruler includes a doubly-resonant non-degenerate optical parametric oscillator (DNOPO) receiving pump pulses from the mode locked fiber comb laser to pump the DNOPO and generate signal and idler output. The outputs are characterized by having respective signal and idler carrier envelope offset frequencies $f_{0s}$ and $f_{0i}$. The DNOPO generates a frequency ruler spectrum at an output thereof. The frequency ruler includes signal processing equipment operatively connected to at least the pump source and the DNOPO. The signal processing equipment is arranged to receive spectral information derived from the pump source and the DNOPO. The signal processing equipment generates a plurality of signals to stabilize the repetition rate of the pump source, or the repetition rate of the DNOPO, and to stabilize the pump carrier envelope offset frequency, $f_{op}$. The respective signal and idler carrier envelope offset frequencies; $f_{0s}$ and $f_{0i}$, of the DNOPO and the frequency ruler are thereby stabilized.

At least one embodiment includes a frequency ruler. The frequency ruler includes a mode-locked pump laser and a doubly-resonant non-degenerate optical parametric oscillator (DNOPO). The frequency ruler further includes a controller operatively connected to the mode locked pump laser and the DNOPO. The controller is arranged to receive a plurality of beat signals and to perform at least three of the following four functions therewith: locking a pump laser repetition rate to a round trip time of the DNOPO, stabilizing a carrier envelope offset frequency, $f_{0p}$, of the pump laser, stabilizing a carrier envelope offset frequency, $f_{0s}$, of at least a signal output of the DNOPO, or locking a pump laser repetition rate.

DETAILED DESCRIPTION OF THE INVENTION

Figure 1:
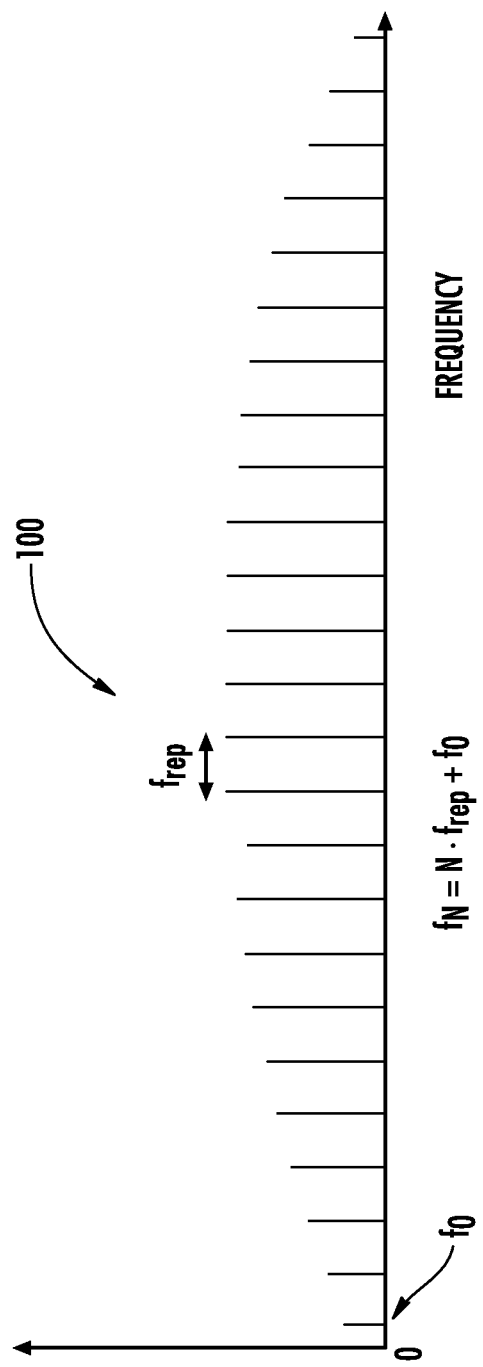
FIG. 1 schematically illustrates a conventional frequency comb.

Optical spectroscopy has seen a great resurgence in interest since the introduction of optical frequency combs, for example as exemplified in U.S. Pat. No. 6,785,303: 'Generation of stabilized, ultra-short light pulses and the use thereof for synthesizing optical frequencies' and U.S. Pat. No. 6,724,788: 'Method and device for generating radiation with stabilized frequency'. Frequency combs are disclosed in '303 as having an output spectrum which can be written as $f_n = nf_{rep} + f_0$ (e.g.: column 2, lines 4-11), where n is an integer and $f_n$ denotes the frequencies of individual comb modes. The frequency spectrum 100 of such a conventional frequency comb laser is further illustrated in FIG. 1. To first order the frequency spectrum is determined by $f_{rep}$ and $f_0$. The frequency comb is derived from a mode locked laser and $f_{rep}$ corresponds to the repetition rate of the pulses generated with the mode locked laser, whereas $f_0$ corresponds to the carrier envelope offset frequency. In '303, $f_0$ is also referred to as the slip frequency (e.g.: column 2, line 8), which is the same for all comb modes in such devices. Because the comb spectrum is derived from a mode locked laser, the phases between individual comb modes are fixed in time with respect to each other and vary only slowly across the pulse spectrum due to effects such as intra-cavity dispersion. Typically, opto-mechanical transducers in conjunction with electronic feedback loops are used to set or stabilize $f_{rep}$ or $f_0$ in such lasers, as also disclosed in U.S. Pat. No. 7,809,222, 'Laser based frequency standards and their applications', which is hereby incorporated by reference in its entirety.

Exemplary applications of optical frequency combs have been demonstrated in Fourier transform spectroscopy based on two frequency comb lasers operating at slightly different repetition rates as discussed in U.S. Patent Application Pub. No. 2011/0043815, entitled 'Referencing of the Beating Spectra of Frequency Combs', Other spectroscopy applications include measuring the response function of samples with frequency combs as discussed in 'Frequency comb analysis', U.S. Pat. No. 6,897,959. Many other examples can be found in the literature.

Figure 2:
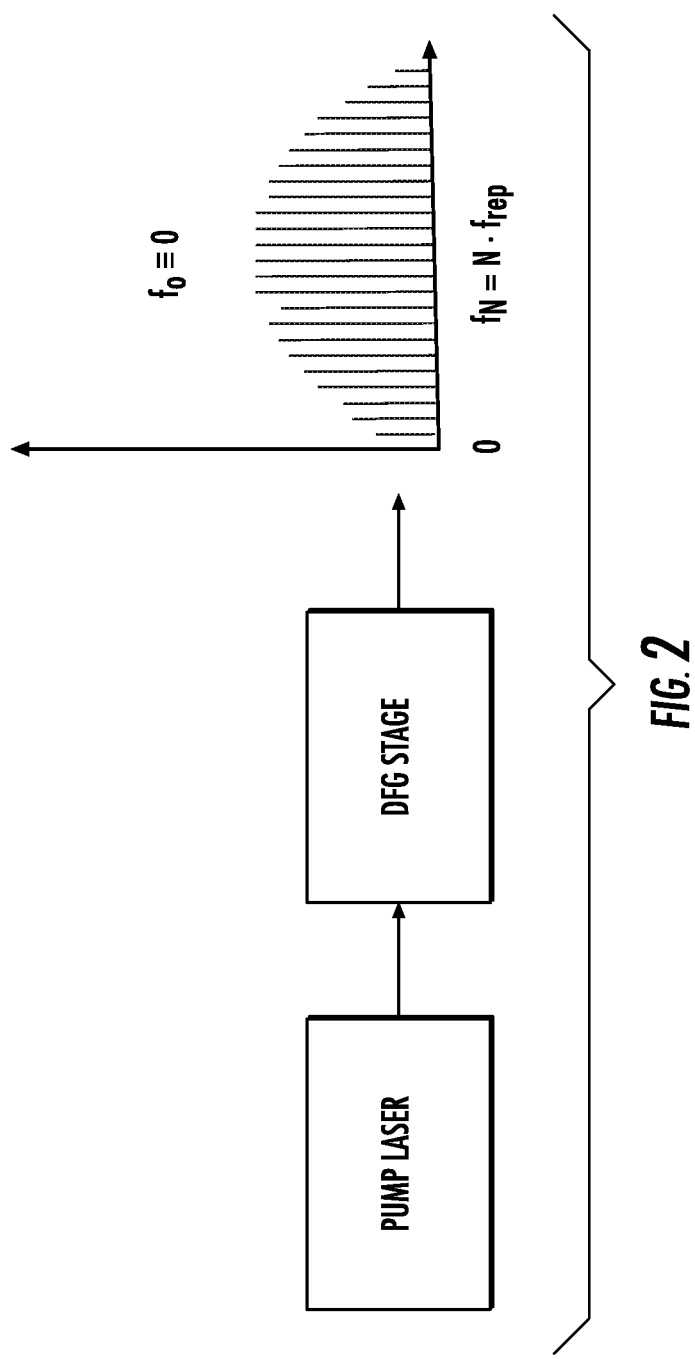
FIG. 2 schematically illustrates a difference frequency generator (DFG) based frequency comb.

In addition to the construction of frequency combs as discussed in '303, other implementations of frequency combs have been demonstrated. One such implementation of a frequency comb is shown in FIG. 2. Here a nonlinear device in the DFG stage acts as a difference frequency generator (DFG) and produces a frequency comb from a pulse train originating from a mode locked pump laser source. With a DFG the carrier envelope offset frequency $f_0$ is also fixed across the whole output spectrum, and with a DFG, $f_0=0$.

Other nonlinear optical devices have been demonstrated where the relation $f_n = nf_{rep} + f_0$ also holds. Examples of such optical devices are highly nonlinear optical fibers that generate a supercontinuum output, for example as described in U.S. Pat. No. 7,809,222. Another example can be a degenerate synchronously pumped optical parametric oscillator (DOPO), for example as described in 'Infrared frequency comb methods, arrangements and applications', U.S. Patent Application Pub. No. 2011/0058248, and in N. Leindecker et al., Opt. Expr., 'Octave-spanning ultrafast OPO with 2.6-6.1 μm instantaneous bandwidth pumped by femtosecond Tm-fiber laser', Opt. Expr., 20, 7046 (2012). Because the DOPO is synchronously pumped, its repetition rate is the same as the repetition rate of the pump laser. Further, for perfect degeneracy, the carrier envelope offset frequency $f_0$ in the output spectrum of a DOPO can be fully characterized by the carrier envelope offset frequency of the pump laser $f_{op}$, where $f_0 = f_{0p}/2$ or $f_0 = f_{0p} + f_{rep}/2$ (where $f_{rep}$ is the repetition rate of the pump laser).

In some other devices, the relation $f_n = nf_{rep} + f_0$ does not hold for the output frequency range of the device. An example of such a device is a non-degenerate OPO (NOPO), where generally the idler and signal frequency have different unstable carrier envelope offset frequencies $f_{0i}$ and $f_{0s}$ respectively, even when the pump $f_{op}$ is stabilized. As described in F. Adler et al., 'Phase-stabilized, 1.5 W frequency comb at 2.8 μm-4.8 μm', Opt. Lett., vol. 34, pp. 1330-1332 (2009), additional electronic feedback loops need to be implemented inside the NOPO that stabilize the carrier envelope offset frequencies of either the signal or idler frequency, $f_{0s}$ or $f_{0i}$ respectively. If $f_{0p}$ is stabilized, and either $f_{0s}$ or $f_{0i}$ is also stabilized, the carrier envelope offset frequencies at both signal and idler frequencies can be determined, because, due to energy conservation, $f_{0p} = f_{0s} + f_{0i}$.

In other devices, such as weakly non-degenerate OPOs (WOPOs), the difference of $f_{0s}$ and $f_{0i}$ can also be stabilized by taking advantage of overlapping signal and idler spectra, as described in R. Gebs et al., '1 GHz repetition rate femtosecond OPO with stabilized offset between signal and idler frequency combs', Opt. Expr., vol. 16, pp. 5397-5405 (2008).

In yet other devices, degenerate doubly resonant synchronously pumped OPOs (DOPOs) were suggested as versatile mid IR sources for operation with stable carrier phase when pumped with a fiber laser comb source, see N. Leindecker et al., Opt. Expr., 'Octave-spanning ultrafast OPO with 2.6-6.1 μm instantaneous bandwidth pumped by femtosecond Tm-fiber laser', Opt. Expr., 20, 7046 (2012).

Notably, for both NOPOs and WOPOs, the expression $f_n = nf_{rep} + f_0$ for the output of the device does not hold across the output spectrum, because the carrier envelope offset frequencies of signal and idler can be different even when they are stabilized. With DOPOs the output spectrum is limited by the condition that the output wavelengths are twice the value of the pump wavelengths.

For any instrumentation application of frequency rulers, mode-locked fiber lasers have several advantages over both mode-locked bulk solid state lasers and mode-locked diode lasers. Mode-locked fiber lasers typically offer superior noise properties compared to mode-locked diode lasers and can be packaged in smaller spaces than mode-locked bulk solid state lasers. Mode-locked fiber lasers can be produced with excellent thermal and mechanical stability. In particular, passively mode-locked fiber lasers can be constructed with few and inexpensive optical components, suitable for mass production, as disclosed in U.S. Pat. No. 7,190,705 ('705), U.S. Pat. No. 7,809,222 ('222), and U.S. Pat. No. 7,649,915 ('915). U.S. Pat. Nos. 7,190,705, 7,649,915, and 7,809,222 are hereby incorporated by reference in their entirety. The dispersion compensated fiber lasers as disclosed in '705 provide for the construction of low noise frequency comb sources. Also disclosed were designs of fiber lasers operating at repetition rates in excess of 1 GHz.

Low-noise operation of fiber lasers limits timing jitter, allowing optimized control of the timing of the pulses. The '705 patent disclosed the first low noise fiber-based frequency comb source. Low noise operation was obtained by controlling the fiber cavity dispersion in a certain well-defined range. Low noise operation of fiber frequency comb sources reduces the noise of the carrier envelope offset frequency $f_{ceo}$ of the laser to a negligible level, and also facilitates measurement and control of $f_{cco}$.

In at least one embodiment of the present invention, a frequency ruler includes a mode locked fiber laser combined with a synchronously pumped non-degenerate optical parametric oscillator. A DNOPO configuration is particularly attractive because it lowers the pump power that is required to initiate parametric oscillation inside the cavity compared to WOPOs and NOPOs. Low pump powers are preferred for operation of OPOs at high repetition rates (300 MHz and higher) with relatively low pump power lasers. Such DNOPOs are particularly useful sources for the mid-IR spectral range where the frequency ruler output allows for precise wavelength determination.

Figure 3:
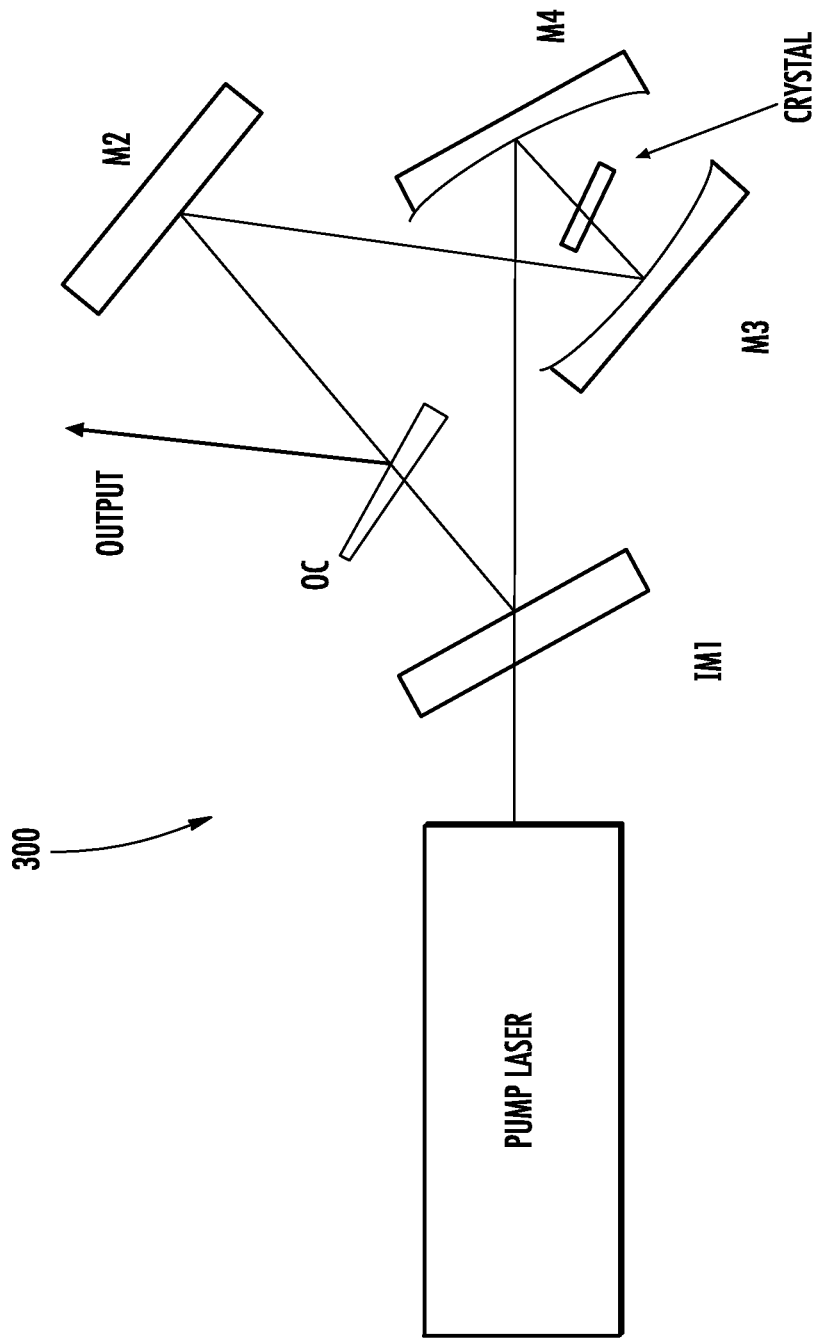
FIG. 3 schematically illustrates several components of a frequency ruler according to an embodiment of the present invention.

FIG. 3 schematically illustrates a frequency ruler arrangement 300 according to an embodiment. The arrangement includes a DNOPO cavity and a pump laser. As used in the present application, and unless otherwise stated, the phrases pump laser, pump laser source, pump source or similar expressions related to the pump arrangement are not to be construed as necessarily limited to only an oscillator. Thus, a pump laser may be an oscillator, but may also include downstream optical amplifier(s) to increase the energy of pump pulses to a suitable level. The pump laser can include a mode locked fiber laser, however, suitable mode locked solid-state or mode locked semiconductor lasers can also be implemented. In the example of FIG. 3 the pump laser generates short ps or fs pulses at a constant repetition rate and with sufficient power to pump the DNOPO, for example a few hundreds of mW, as will be discussed below.

The DNOPO cavity shown in the example of FIG. 3 is constructed using mirrors IM1, M2, M3 and M4 and is astigmatically compensated to compensate for the astigmatism induced by the intra-cavity nonlinear parametric crystal. Such astigmatically compensated cavities are well known in the state of the art and not further described here. Preferably the crystal shown in FIG. 3 is inserted into the cavity at a Brewster angle. In principle any nonlinear crystal that offers the desired optical transparency range, phase-matching conditions and second-order nonlinear coefficients can be used. For example, crystals such as periodically poled $LiNbO_3$ (PPLN), optically patterned GaAs (OPGaAs), optically patterned GaP, AgGaS, AgGaSe, and ZGP can be used. These crystals are well known in the state of the art and mainly used for the near IR to far IR spectral ranges. However, other nonlinear crystals can also be implemented.

For mid-IR generation, a Tm fiber pump laser operating in the 1800-2000 nm wavelength range can be used. However, Er, Ho, Yb and Nd fiber lasers and amplifiers can also be implemented. The input mirror IM1 is designed to pass the pump wavelength and to provide high reflectivity for the signal and idler wavelengths. Mirrors M2-M4 can be conveniently gold-coated to provide high reflectivity for both the signal and idler wavelengths. Output coupling from the DNOPO can be obtained by a transparent wedge OC inserted into the cavity. Alternatively, any of the DNOPO cavity mirrors could also be converted into an output coupling mirror by using an appropriate dielectric coating.

Because the DNOPO is resonant for both the signal and idler wavelengths, operation of the DNOPO is sensitive to a cavity length mismatch between the pump laser and the DNOPO to within a fraction of a wavelength. To synchronize the repetition rate of the DNOPO to the pump pulses various locking schemes can be implemented. For example a dither lock or an optical synchronization lock (explained later) can be implemented. For implementation of a dither lock a signal generator is used in conjunction with a piezoelectric transducer that modulates the position of one of the cavity mirrors and thereby the DNOPO cavity length. Typically, the cavity length of the DNOPO is modulated by a few picometers (pm) at a high frequency (1-1000 kHz) and the resulting power fluctuations of the DNOPO are detected with a detector. The sinusoidal signal from the signal generator and the detector are then mixed and a feedback circuit is used to lock the two signals at a phase offset of 90 degrees (not counting any differential phase delay in the detection system), which is the optimum locking point of the DNOPO. Such dither locks are well known in the state of the art and not further explained here. Generally, for operation above threshold, DNOPO oscillation can be achieved at several cavity length positions, where these cavity length positions are separated in space by approximately the pump wavelength. This is also described in N. Leindecker et al. We refer to these cavity length positions here as resonances.

To stabilize $f_{Os}$ and $f_{Oi}$ inside the DNOPO with high precision it is further useful to stabilize the carrier envelope offset frequency of the pump source, which may include a mode locked fiber oscillator. Schemes for carrier envelope offset frequency control of lasers have been, for example, disclosed in U.S. Pat. No. 7,649,915, entitled 'Pulsed laser sources'. In conjunction with a control of the repetition rate of the pump source (as also disclosed in '915) a well-defined frequency ruler using the output of the DNOPO can be obtained. Here $f_{Os}$ and $f_{Oi}$ are invariant in time and it further holds that $f_{Op}=f_{Os}+f_{Oi}$. The relative stability of $f_{Os}$ and $f_{Oi}$ in the DNOPO compared to the observed relative fluctuations of $f_{Os}$ and $f_{Oi}$ inside NOPOs and WOPOs results from the doubly resonant operation of the DNOPO, where both the signal and idler wavelength are resonated inside the DNOPO cavity.

The relative values of $f_{Os}$ and $f_{Oi}$ can further be adjusted by adjustments within the nonlinear optical system, for example by controlling the group velocity dispersion inside the DNOPO. The group velocity dispersion can be modified by translating the wedged output coupler (OC) in and out of the cavity of the DNOPO. Other adjustments can also be incorporated; for example a modulation of the carrier envelope offset frequency of the pump $f_{op}$, a modulation of the pump repetition rate or the DNOPO cavity length generally also influences the exact values for $f_{Os}$ or $f_{Oi}$.

Figure 4:
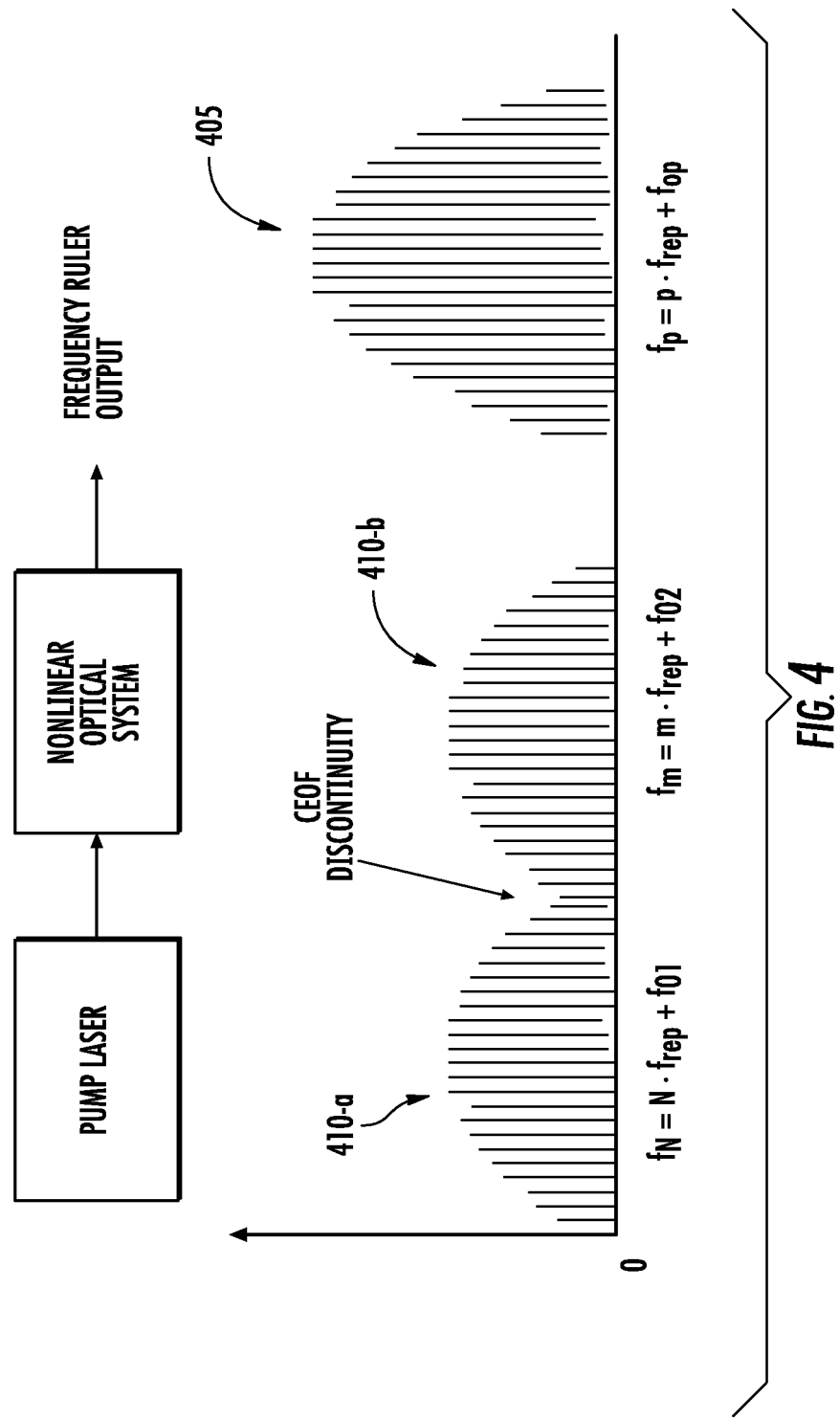
FIG. 4 schematically illustrates the comb modes in a frequency ruler spectrum according to an embodiment of the present invention.

A generic frequency ruler generated by such a DNOPO is shown in FIG. 4. The DNOPO is represented by a nonlinear optical system and may include signal processor(s) (not shown) to monitor and stabilize the comb lines of the pump laser and DNOPO. The pump in this example produces a comb spectrum 405 given by $fp=pf_p+f_{Op}$. In contradistinction to a conventional frequency comb 100, the output of the nonlinear optical system contains a frequency shifted ruler spectrum comprising at least two distinct spectral sections with respective comb spectra $f_n=nf_n+f_{O1}$ and $f_m=mf_m+f_{O2}$. A residual pump spectrum can also be contained in the output spectrum. For this example using the DNOPO, the comb modes with subscript n refer to the idler spectrum 410-a, whereas the comb modes with subscript m refer to the signal spectrum 410-b. The signal and idler spectra do not need to be adjacent to each other; in general the carrier envelope offset frequencies for signal and idler will be different, i.e. there is a change in the carrier envelope offset frequency between signal and idler or there is at least one discontinuity in the frequency spacing of the comb modes when going from the signal to the idler part of the output spectrum. Thus, as a function of frequency, the carrier envelope offset frequency (CEOF) is not constant but exhibits a discontinuity in the transition between the signal and idler spectrum The output can also comprise additional spurious signals and spectral content arising from nonlinear frequency mixing between pump, signal and idler.

Figure 5A:
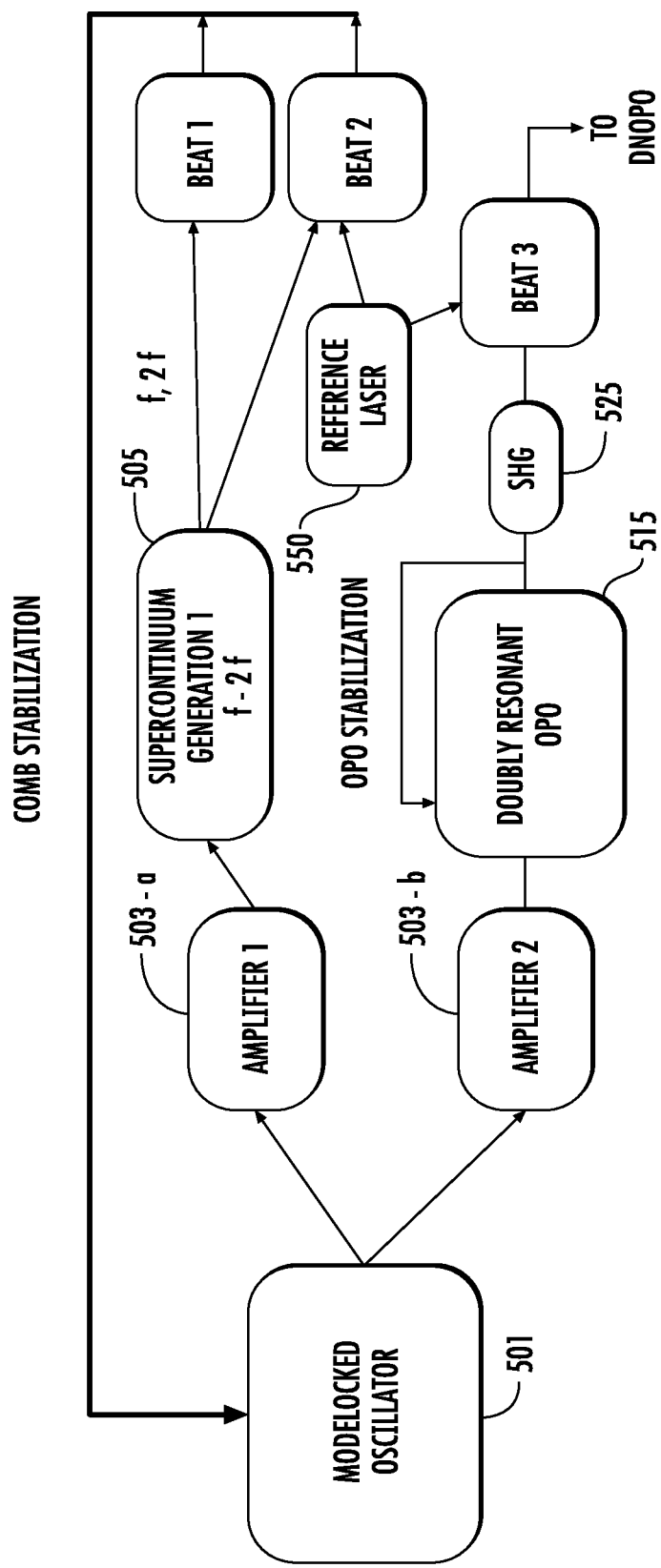
FIG. 5A schematically illustrates a construction of a system that includes a doubly resonant non-degenerate optical parametric oscillator (DNOPO) pumped by a Tm fiber comb laser and Tm fiber amplifier.
Figure 5B:
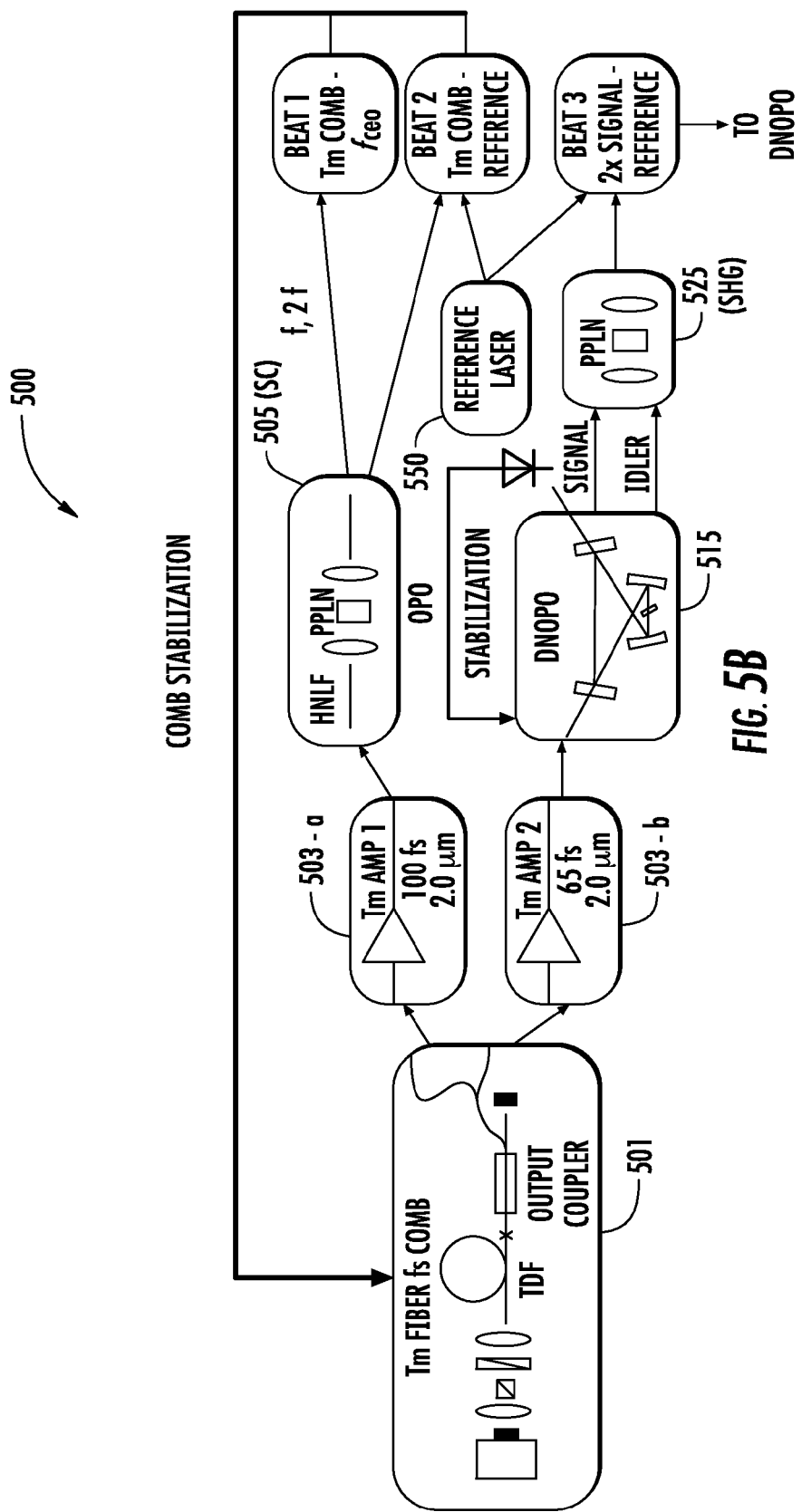
FIG. 5B schematically illustrates a system according to FIG. 5A in further detail.

FIGS. 5a and 5b schematically illustrates the construction of a system 500 that includes a doubly resonant, non-degenerate OPO (DNOPO) and a pump which includes a Tm fiber comb laser. FIG. 5b illustrates the arrangement of FIG. 5a in further detail showing components suitable for use in various preferred embodiments.

In this example a Tm fiber-based laser 501 generates a frequency comb. The output is split and a first output portion directed to a first Tm amplifier 503-a, and a second portion to a second Tm amplifier 503-b. The output of amplifier 503-a is used for supercontinuum generation (SC) and followed by a measurement of $f_{Op}$ using an f-2f interferometer (as well known in the state of the art) with detection and signal processing components disposed in supercontinuum generator 505 and/or arranged in downstream signal processing equipment. The amplified mode locked pulses at the output of amplifier 503-b are used to pump the DNOPO 515. In this example, the signal or idler outputs of the DNOPO 515 are also frequency converted (e.g.: second harmonic generation, SHG) in frequency converter 525, preferably with a PPLN based second harmonic generator as illustrated in FIG. 5b.

In this example the SC generator 505 uses a highly nonlinear fiber (HNLF) for super continuum generation; a spectral subsection of the super continuum output is then frequency doubled and the interference between the non-doubled part of the supercontinuum and the doubled part constitute the f-2f interferometer; the interference signals are further detected and used to stabilize the carrier envelope offset frequency of the Tm fiber comb system with analog and/or signal processing equipment (e.g.: a signal processor, not shown). In conjunction with the reference laser 550, one of a plurality of beat signals, BEAT3, is generated. BEAT3 is generated via interference between the frequency doubled DNOPO signal and the reference laser 550 output, the reference laser 550 in this example being set for 1.65 µm operation. As illustrated in FIG. 5a, the generated supercontinuum, or a filtered portion thereof, may also be mixed with the reference laser output to form beat signal BEAT2, which may be utilized as a test signal. The generated supercontinuum is also used to obtain a beat signal from the shown f-2f interferometer to measure the carrier envelope offset frequency of the Tm pump laser. This also may be carried out in a self-referencing arrangement as known in the art and discussed in '705 and U.S. Pat. No. 7,649,915. As illustrated in FIG. 5a, BEAT1 (and BEAT2) can be used to stabilize (and monitor) the frequency comb source 501 via comb stabilization with a stabilizer (not separately shown). Stabilization is also provided for the DNOPO as will be further discussed below. By way of example, operation of a constructed frequency ruler in accordance with the system 500 is discussed in further detail below.

In a construction of an exemplary embodiment of this invention, as schematically illustrated in FIGS. 5a and 5b, a Tm fiber-based frequency comb laser 501 was used as a laser source. Such Tm based comb lasers were, for example, disclosed in U.S. patent application Ser. No. 13/026,762, ('762), entitled 'Compact, coherent, and high brightness light sources for the mid and far IR', filed Feb. 14, 2011, and are not further described here. In the example of FIG. 5a, the pump source for the DNOPO 515 includes a Tm fiber oscillator 501 and a Tm fiber amplifier 503-b. The Tm-fiber comb oscillator produced a 100 MHz train of 60 nm bandwidth pulses which were amplified to 300 mW in the Tm fiber amplifier 503-b, resulting in a pulse width of 65 fs with a center wavelength of 2020 nm. As discussed above, part of the comb laser output was also amplified in a second Tm amplifier 503-a and used for octave spanning supercontinuum generation. With the help of the generated supercontinuum, the two degrees of freedom of the oscillator comb, namely $f_{rep}$ (repetition rate) and $f_{0p}$ (carrier envelope offset frequency of the pump laser) are then fixed, where the frequency of one comb tooth was set by phase-locking to a low noise single-frequency diode laser at 1565 nm using BEAT2 with reference laser 550. The second degree of freedom was fixed by self-referenced phase-locking of $f_{0p}$ using BEAT1. Therefore, all comb lines of the pump laser were stabilized.

The portion of the amplified Tm-fiber comb at 2020 nm generated in 501 and amplifier 503-a was used to synchronously pump the DNOPO 515 based on orientation-patterned gallium arsenide (OPGaAs) with a pattern period of 60.5 µm. Using two intra-cavity curved mirrors with a radius of curvature of 50 mm for intra-cavity focusing (see FIG. 3 for comparison) the DNOPO oscillation threshold was achieved with an average pump power <50 mW. A combined output power from the DNOPO in the signal and idler spectra of up to 30 mW was achieved.

The DNOPO 515 cavity length was stabilized (OPO stabilization in FIG. 5a) for doubly resonant operation using the "dither-lock" technique described above. To implement the dither lock, one of the cavity mirrors was mounted onto a PZT, the output of the DNOPO was detected with a mid-IR photodetector, and an electronic servo loop system (denoted with OPO stabilization in FIGS. 5a and 5b) was used for cavity length stabilization. The signal and idler outputs were generated in the spectral ranges from (3.1-3.8 µm) and (4.4-6.2 µm) respectively. To measure the frequency of one DNOPO signal field comb line, the DNOPO output at 3.2 µm was frequency doubled as shown, and a beat signal with the 1.65 µm single frequency laser 550 was detected (BEAT3). The set up essentially allows one to deterministically measure and track any carrier envelope offset frequency fluctuations of the DNOPO signal $f_{0s}$ induced by changes in $f_{0p}$.

Indeed it was verified that as long as $f_{0p}$ was stable, $f_{0s}$ was also stable, moreover, $f_{0s}$ was tracking $f_{0p}$, i.e. the ratio of $f_{0p}/f_{0s}$ was stable when changing $f_{0p}$. In other words without any opto-mechanical adjustments to the DNOPO and for a given value of $f_{0p}$, the values of $f_{0s}$ and $f_{0i}$ inside the DNOPO were passively stable and fluctuating in only a small frequency range, i.e. within much less than 10% of the comb spacing—or repetition rate $f_{rep}$—of the pump laser 501. However, the bandwidth of the DNOPO comb lines generally increased due to frequency and amplitude noise incorporated from the dither lock. For ultra-high resolution spectroscopy, the increase of the comb bandwidth can be reduced by using an optical synchronization lock, as explained below. Even in the presence of some comb bandwidth broadening, the stability of $f_{0s}$ and $f_{0i}$ in the DNOPO is a great advantage compared to NOPOs and WOPOs, since the operation of a DNOPO with a stable frequency ruler spectrum is dependent only on the provision of a near IR pump comb laser. Manufacturing techniques for near IR comb lasers are well known in the state of the art and near IR comb lasers are readily commercially available.

Although $f_{0s}$ or $f_{0i}$ inside the DNOPO are locked to the pump laser $f_{0p}$, they are not known a priori, moreover, $f_{0s}$ or $f_{0i}$ are different for each DNOPO resonance. Hence a beat experiment with a characterized cw reference laser as described here is to be carried out to measure $f_{0s}$ or $f_{0i}$. Alternatively, to measure the values of either $f_{0s}$ or $f_{0i}$ inside the DNOPO, high resolution wavemeters or reference gas cells can be used. As another alternative, the DNOPO output can be interfered with a supercontinuum spectrum generated directly from the fiber pump system.

In the above example the dither lock actuators are located in the DNOPO cavity to lock the DNOPO cavity to the pump cavity. Similarly the dither lock actuators can also be located in the fiber laser cavity and the pump cavity can be locked to the DNOPO cavity.

As discussed above, a drawback of dither locks for DNOPO cavity length stabilization is the added frequency noise of the DNOPO comb lines and added amplitude noise to the DNOPO output. Various strategies can be implemented to limit the addition of frequency or amplitude noise. For example an optical synchronization lock can be used for cavity length stabilization.

Figure 6:
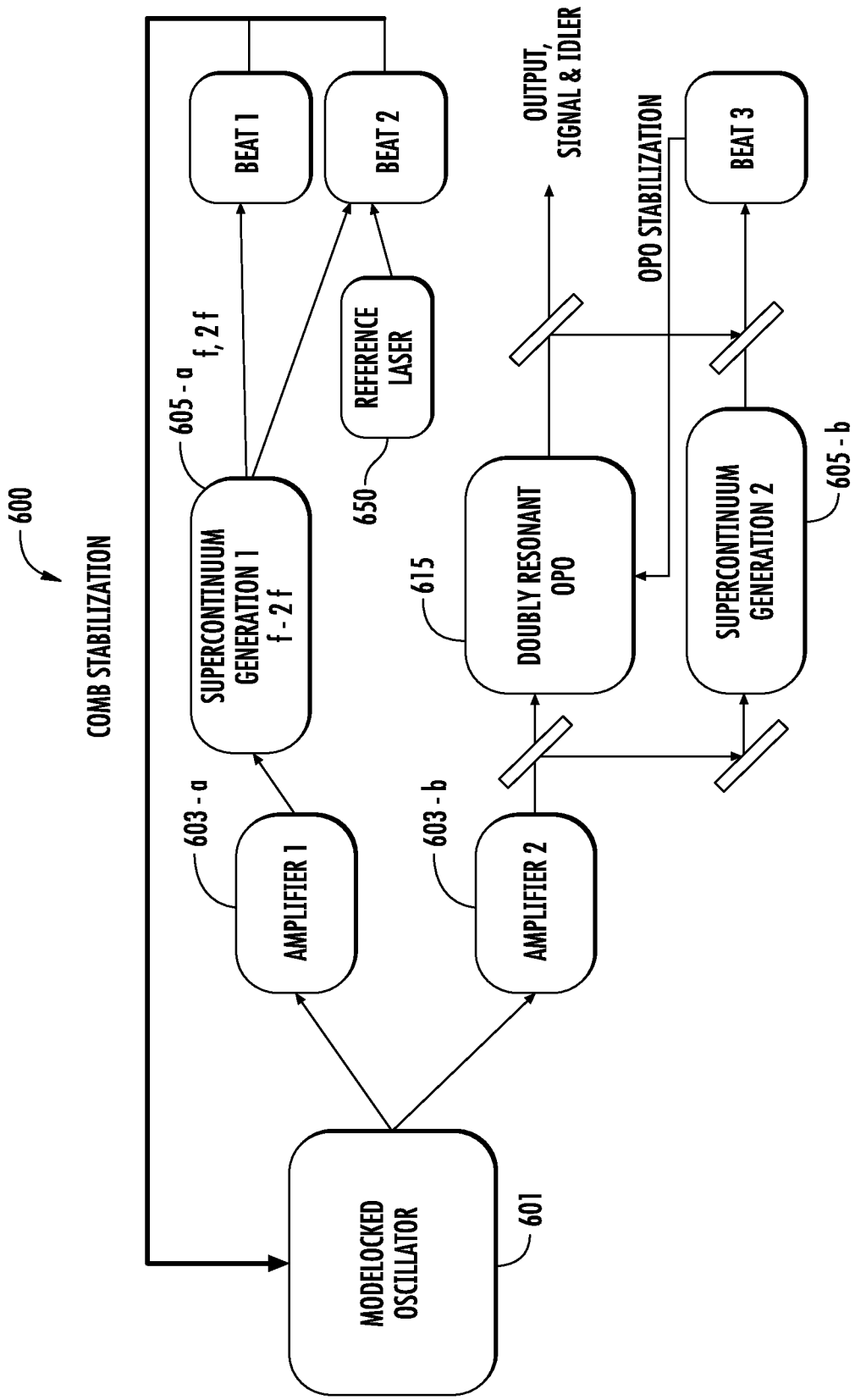
FIG. 6 schematically illustrates a construction of a system that includes a doubly resonant non-degenerate optical parametric oscillator (DNOPO) including further provisions for locking the cavity length of the DNOPO to the cavity length of the Tm fiber comb system via an additional beat signal between the DNOPO frequency ruler and the Tm fiber comb.

An exemplary implementation of an optical frequency ruler configuration 600 utilizing an optical synchronization lock is shown in FIG. 6. Several components may be similar or identical to those illustrated in FIGS. 5a and 5b. As discussed with respect to FIGS. 5a and 5b, a Tm fiber-based frequency comb laser 601 is used to provide stable frequency comb lines. The Tm comb laser 601 output is further amplified in two Tm amplifiers. Tm amp 1 603-a provides input for near IR supercontinuum stage 605-a, and more particularly for $f_{0p}$ detection and control with an f-2f interferometer as discussed above with respect to FIG. 5a. Tm amp 2 603-b is used for pumping the DNOPO 615. In at least one embodiment a higher-power comb source may be used as the input to the DNOPO 615 and the amplifiers 603-a, 603-b omitted.

In contrast to the implementation shown in FIG. 5a, a fraction of the output from Tm amp 2 603-b is further diverted into a second fiber supercontinuum stage 605-b to generate a mid-IR continuum which overlaps partially with the DNOPO 615 spectrum. In some embodiments the second supercontinuum stage 605-b may be utilized to generate f-2f signals for measurement of $f_{0p}$ and the stage 605-a optionally eliminated. The output of the mid-IR second supercontinuum stage 605-b introduces the capability to lock the DNOPO cavity to the Tm frequency comb pump laser, as will be further discussed below.

Regarding generation of the mid-IR continuum, highly nonlinear fibers and waveguides, such as fluoride, chalcogenide, tellurite, bismuth or silicon fibers or waveguides, or fibers and waveguides based on other materials may be utilized, as known in the state of the art. Such fibers or waveguides can also include tapers to facilitate input coupling.

As a result of the arrangement in FIG. 6, one can now observe the three following beat signals: BEAT1 measures the Tm comb $f_{0p}$ using the output of the supercontinuum generator and the f-2f self-referencing technique. BEAT2 measures the beat between a comb line of the Tm comb and a cw single frequency reference laser. BEAT3 measures the beat between a subsection of the Tm comb lines and a subsection of the signal output of the DNOPO. BEAT2 can, for example, be used to optically lock the Tm comb lines to an optical frequency reference, for example reference laser 650, as may be required for ultra-high precision spectroscopy.

With BEAT1 and BEAT2 stabilized to respective RF references (not shown) and additional knowledge of the repetition rate of the Tm pump laser, a fully characterized DNOPO output spectrum can be obtained, where the absolute location of the DNOPO comb lines can be precisely determined. This can be understood, since BEAT1 measures $f_{0p}$ and BEAT3 measures essentially $f_{0s}$-$f_{0p}$.

Furthermore, stabilization of BEAT3 to an RF reference automatically locks the cavity length of the DNOPO to the Tm pump laser repetition rate. This can be understood from the fact that $f_{0s}$ in the DNOPO output depends precisely on any cavity length mismatch between the DNOPO cavity and the fiber pump laser. Any small length mismatch changes the exact spectral output and the dispersion of the DNOPO and thus $f_{0s}$. Hence, $f_{0s}$ is a precise measurement of any mismatch in fiber pump cavity and DNOPO cavity lengths. A slow feedback loop that uses an intra-cavity mirror (not shown) inside the DNOPO can thus stabilize its cavity length using BEAT3 as a control signal for DNOPO stabilization.

Notably, stabilization of the three beat signals to respective external RF references performs the following four functions: 1) locking the pump laser repetition rate to the round trip time of the DNOPO with BEAT3, 2) stabilization of the carrier envelope offset frequency of the pump laser with BEAT1, 3) stabilization of the carrier envelope offset frequency of at least the signal output of the DNOPO with BEAT3, 4) locking of the pump laser repetition rate via BEAT2. Thus, the ruler or comb spectrum of the DNOPO is fully characterized, but for the negligible drift of the cw laser reference frequency. Moreover with the help of the three beat signals, the comb line bandwidth of the DNOPO can then be stabilized to sub 50 kHz level bandwidths, sub 100 Hz or even sub Hz level bandwidths, which is desirable for precision spectroscopy. Using a configuration as shown in FIG. 6, we indeed verified a relative comb line-width between pump and DNOPO of sub-Hz level, limited by the detection electronics.

To bring the DNOPO and the fiber pump laser into resonance, a scan of the cavity length of the DNOPO can be used and once several resonances are found, one resonance can be selected and the DNOPO cavity length can be controlled using BEAT3. In at least one embodiment the length of the fiber pump laser can be separately controlled to stabilize BEAT3 and to lock the two cavity lengths to each other.

Other methods can be incorporated for a detection of the DNOPO carrier envelope offset frequencies. Just as NOPOs constructed with highly nonlinear crystals (e.g.: as disclosed by F. Adler et al.) offer options for carrier phase control with spurious NOPO outputs, additional functionality can also be added by using spurious DNOPO outputs. Referring back to the example described in FIG. 5a, we can also expect to observe a spurious frequency doubled signal from a DNOPO; in this example the frequency doubled output would be expected in the vicinity of 1.6-1.9 pm. For future reference we refer to this as the $S_2$ signal. Alternatively, a nonlinear crystal can also be used to frequency double the DNOPO output. The $S_2$ signal can then be spectrally overlapped and interfered with the supercontinuum generated in the highly nonlinear fiber (HLNF), which is located in the supercontinuum generator 505. The supercontinuum signal that spectrally overlaps with the $S_2$ signal is referred to as the SC signal. When DNOPO 515 oscillates, the beat signal between the SC and the $S_2$ signals can be detected with a detector (not shown) to determine the value of $f_{0s}$ inside the DNOPO. As shown in the example of FIG. 5a, for comb stabilization, the beat signal between the SC and the $S_2$ signal can further be implemented as an error signal to lock the comb laser 501 cavity length to the DNOPO cavity length using cavity length control (not shown) inside the laser source 501. An output of 501 is utilized to pump the DNOPO, thus facilitating an optical synchronization lock of the pump laser to the DNOPO. Additional locking of $f_{0p}$ with the help of supercontinuum generation thus allows the construction of a frequency ruler where the DNOPO is used as a reference cavity.

The cavity length of the DNOPO or the pump laser can further be locked to cw reference lasers to produce a fully stabilized frequency ruler output spectrum. In such an arrangement a single supercontinuum generation stage may be used to generate the three beat signals for the facilitation of an optical synchronization lock of the pump laser 601 to the DNOPO 615. The supercontinuum stage may be configured for either the near IR or mid-IR. In at least one embodiment the f-2f signal BEAT1 and BEAT2 can be derived from the second supercontinuum generation stage 605-b. Numerous possibilities and permutations exist.

Depending on the nonlinear crystals and pump lasers used for such DNOPOs any beat signals between comb modes, with the same carrier envelope offset frequency as the pump laser, and spurious outputs from the DNOPO can be used to stabilize or characterize $f_{0s}$ and $f_{0i}$ inside the cavity as well as to lock the DNOPO cavity length to the pump laser cavity length.

As shown in FIGS. 5 and 6, feedback signals for comb stabilization are provided for control and stabilization of comb sources 501, 601 and DNOPOs 515, 615, respectively. Signal processing equipment is used in the BEAT1 . . . BEAT3 modules shown which generate the respective beat signals. The equipment may include photodetectors, amplifiers, electrical and/or optical filters, optical fibers and couplers to generate the signals which in turn are used to control the comb source and DNOPO. The equipment may be conveniently interconnected to a system computer (not shown).

The BEAT signals may be utilized with a control system to stabilize the carrier envelope offset frequency, $f_{0p}$, of the of the Tm comb (DNOPO pump source) and to lock a carrier envelope offset frequency of the DNOPO, $f_{0s}$, to the carrier envelope offset frequency, $f_{0p}$. The repetition rates of the respective Tm comb lasers and DNOPOs may also be locked to each other. As discussed above, at least three of four such functions may be implemented with three beat signals. Several possibilities exist for signal processing and feedback control using information derived from the supercontinuum generator(s) and the associated f-2f interferometer(s), together with stable cw laser reference(s). Spectral information obtained from the supercontinuum generator and/or from one or more stable reference lasers may be used with signal processing equipment to provide signals for tracking and stabilization of the pump and DNOPO laser parameters. Signal processing and control functions may be distributed about the system in such a way as to at least fully characterize the Tm comb output and frequency ruler generated by the DNOPO. It is possible to further increase the overall resolution of the system, which is desirable for precision spectroscopy.

Figure 7:
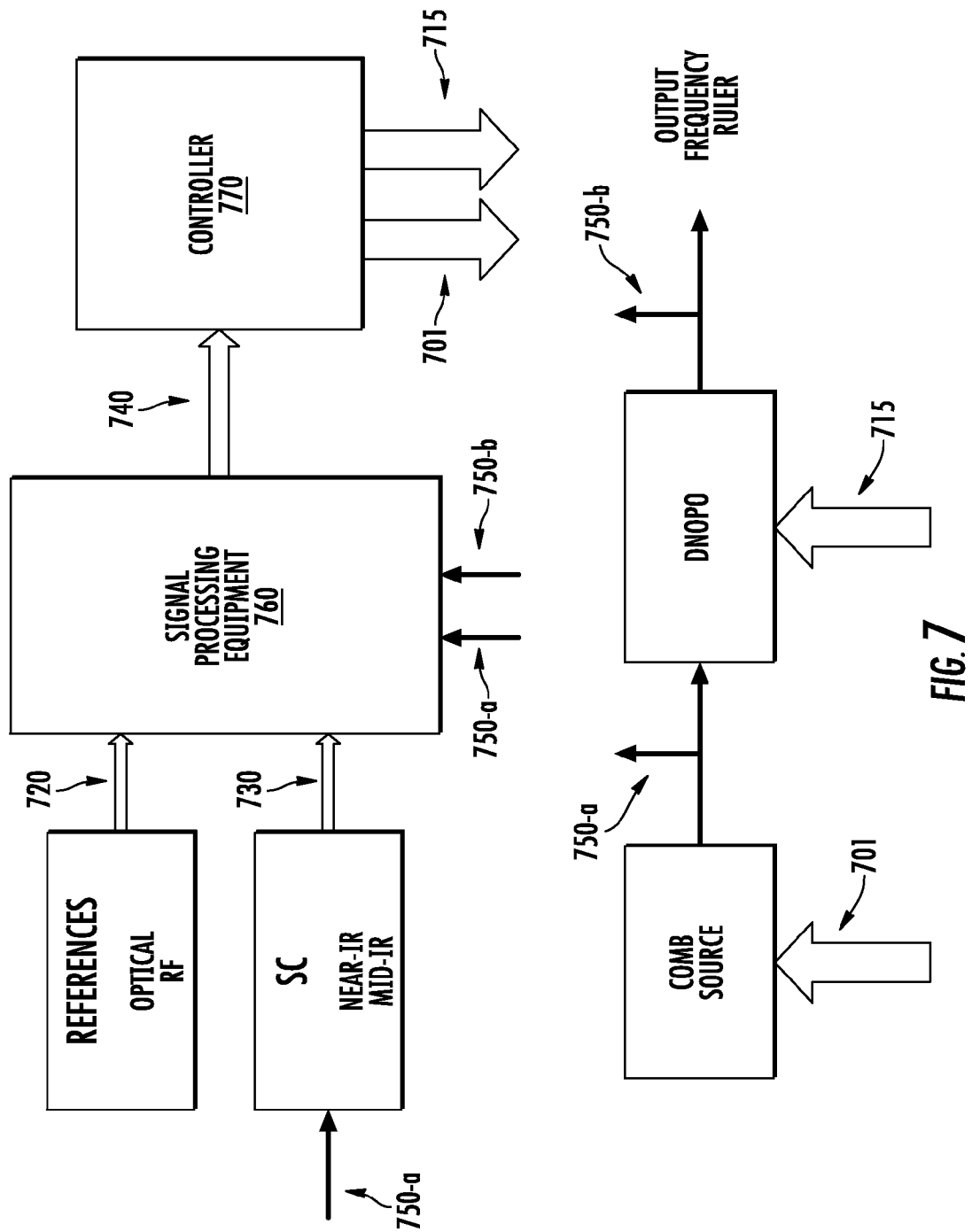
FIG. 7 schematically illustrates an exemplary signal processing and control arrangement for stabilizing a frequency ruler, suitable for use in the systems of FIGS. 3-6.

FIG. 7 schematically illustrates signal processing equipment (SPE) and feedback control circuitry in accordance with exemplary embodiments, for use with any of all of the systems of FIGS. 3-6. In the example of FIG. 7, the comb source includes a mode locked laser and optional amplifiers, as discussed above with respect to FIGS. 5 and 6. The output 750-a is directed to the DNOPO and also to at least one supercontinuum generator (SC) which may generate near-IR and/or mid-IR supercontinuum(s).

The comb source and DNOPO outputs 750-a and 750-b may also be connected to the signal processing equipment (SPE) for processing, monitoring, or other functions. For example, comb laser source and/or DNOPO parameters 705-a, 750-b may be monitored and used to track and adjust the parameters over time. During setup the arrangement may be used to identify the DNOPO resonances and to lock the DNOPO cavity as discussed above.

The output 730 of SC is provided to the SPE to derive a signal representative of a carrier envelope offset frequency using, for example, an f-2f interferometer and the well-known self-referencing method (not shown). Commonly owned U.S. Pat. No. 7,649,915 ('915), entitled "Pulsed laser sources", is hereby incorporated by reference in its entirety, and discloses the f-2f self-referencing technique. For example, arrangements are described in at least FIGS. 8A-8G of '915 and the corresponding text. An exemplary comb source is shown in FIG. 8A of '915, including an arrangement for self-referencing and a feedback system for oscillator control. Such techniques may be utilized in the arrangement of FIG. 7 herein for measurement and control. In a similar manner, a mid-IR SC may be generated and used to stabilize the DNOPO with appropriate highly non-linear optical elements.

As discussed with respect to FIGS. 5 and 6, various RF and optical references may be utilized and used to stabilize the carrier envelope offset frequencies and repetition rates of the comb laser and DNOPO. One or more such reference signals 720 may be used by the SPE. One or more low drift cw reference lasers may be utilized, and may include diode lasers, or other suitable optical references. RF references may be also selected with suitable frequency accuracy.

The controller, operatively connected to the SPE, provides control signals 701, 715 to stabilize the carrier envelope offset frequency and/or repetition rate of both the comb laser and/or DNOPO. The controller may include phase locked loops, adaptive control and/or tracking algorithms as well as RF reference signals, or other auxiliary functions. The controller may be interfaced with, or arranged as part of a system computer.

As illustrated in FIG. 7, various optical and/or RF reference signals 720 are provided to the SPE. Stabilization of the beat signals to an RF reference signal may be implemented with phase-locked loops in the SPE/controller as well known in the state of the art. In certain embodiments the beat signals may be measured with dual balanced detectors as well known in the state of the art. Radio-frequency (RF) filters can be used to lower the noise floor around the center frequency of the beat signals. The phase locked loops generally incorporate a phase detector which compares the phase of the beat signal(s) derived from the mid-IR and/or near IR supercontinuum (SC) to an RF reference and generates an error signal. The error signal is then processed by loop filters which can be configured as proportional-integral-derivative (PID) controllers which act on the appropriate actuator to stabilize the frequency of the beat signal. For example, to stabilize the carrier envelope offset frequency of the Tm pump laser using BEAT1, the actuator can be the pump current to the Tm fiber oscillator (comb source) provided by a feedback signal in feedback path 701. Both a slow and a fast feedback loop may be implemented. In various embodiments the slow feedback loop is configured as an integrator, with the output (control signal) of the fast feedback loop as input. The output from the slow feedback loop is then used for slow control of the actuator and the fast feedback loop is used for fast control. In at least one embodiment the slow feedback loop may operate with a response bandwidth in the range from about 1 Hz-1 kHz and the fast feedback loop in a range from about 50 Hz to 1 MHz. Feedback loops with more than two response times may also be implemented. Such schemes are well known in the state of the art and were, for example, discussed in commonly owned U.S. Patent Application No. 61/617,482, entitled "Methods for precision optical frequency synthesis and molecular detection", filed Mar. 29, 2012 which is hereby incorporated by reference in its entirety.

Based on signals from the controller the oscillators and DNOPOs may be controlled. As discussed in the '915 patent, intra-cavity components of a mode locked oscillator may be automatically adjusted based on signals from a controller to control carrier envelope offset frequency and laser repetition rate. For example, the oscillator pump current, oscillator intra-cavity loss, temperature/pressure of intracavity elements such as gratings, or other elements may be adjusted to control carrier offset $f_0$. The position of cavity mirrors, fiber length and the like may be adjusted via piezoelectric positioners to control the cavity length, and therefore adjust $f_{rep}$. Such arrangements are also described in at least FIGS. 8A-8G of '915 and the corresponding text at Col. 13-19.

In accordance with embodiments of the present invention the exemplary arrangement of FIG. 7 may be used to fully characterize, monitor, and stabilize the frequency ruler. In certain preferred embodiments an FPGA based controller and DSP equipment may be utilized in one or both of SPE 760 or controller 770 to provide a compact, integrated measurement and control system suitable for precision comb metrology applications.

Figure 10:
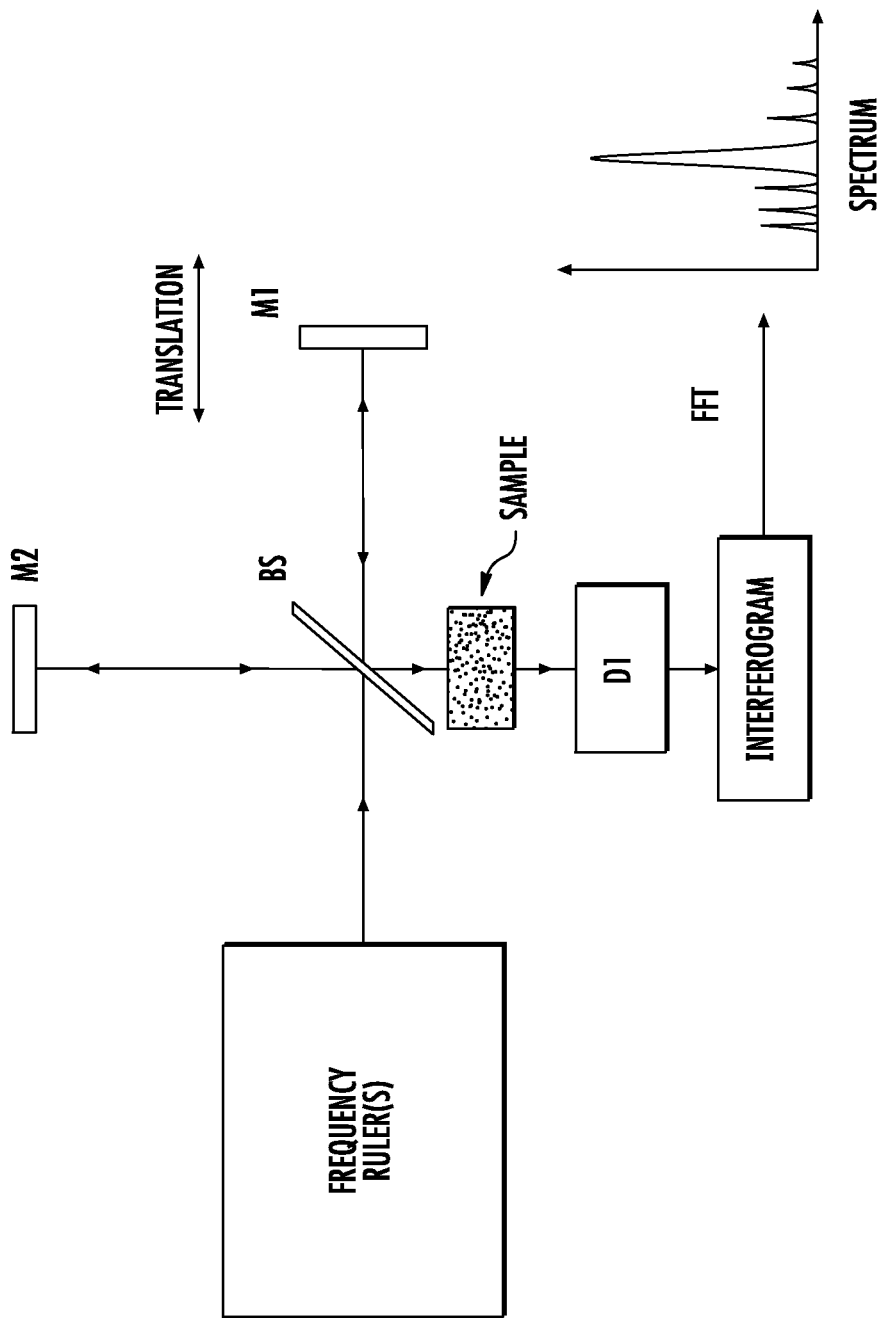
FIG. 10 illustrates an example of a Fourier transform spectroscopy (FTIR) system arranged with a frequency ruler.

The frequency ruler embodiments described herein are desirable for a number of spectroscopy applications, for example Fourier transform spectroscopy (FTIR) as illustrated in FIG. 10, or direct comb spectroscopy. As illustrated in FIG. 10, an FTIR system includes frequency ruler(s) optically coupled to an interferometer, for example a Michelson interferometer. An interferogram of a sample is recorded with detector D1. The Fourier transform (e.g.: FFT) then provides the optical spectrum. For example, two such frequency rulers can be constructed and operated at slightly different repetition rates for applications in Fourier transform spectroscopy. Such dual comb systems were for example described in U.S. Pat. No. 8,120,778: 'Optical scanning and imaging systems based on dual pulsed laser systems', which is hereby incorporated by reference herein.

Alternatively, various embodiments of frequency rulers described herein can be constructed at a repetition rate of >300 MHz, or preferably >500 MHz and most preferably at repetition rates >1 GHz for applications in direct comb spectroscopy. Methods for direct comb spectroscopy were for example disclosed in U.S. patent application Ser. No. 12/955, 759, ('759), entitled: 'Frequency comb source with large comb spacing', filed Nov. 29, 2010, and which is hereby incorporated by reference herein. In brief, when using a frequency ruler with a comb spacing >500 MHz bulk optic components can be readily used to resolve individual comb lines and the individual comb lines can then be detected with a detector array. One such implementation was discussed in '759.

In such a direct comb spectroscopy system the output from the DNOPO passes through a sample under test, for example a gas cell, before being dispersed in one or two dimensions with a grating spectrometer and a virtually imaged phase array (VIPA). Such systems are well known in the state of the art and will be further discussed below. With sufficient comb spacing the individual comb lines can then be resolved in one or two dimensions and imaged onto a one or two dimensional detector array respectively. An optical resolution of about 0.5-10 GHz per pixel of the detector is thus achievable with state of the art VIPAs in the mid-IR spectral range.

A scheme with a solid-state laser based multi-GHz repetition rate comb system and a two dimensional angular dispersion element as well as a two dimensional detector array was previously described in S. Diddams et al., 'Molecular fingerprinting with the resolved modes of a femtosecond laser frequency comb', Nature, vol. 445, pp. 627 (2007). However, a system with a fiber laser pumped GHz-level repetition rate OPO was not considered. With advancements as described herein low noise OPO frequency rulers at repetition rates of 1

GHz and higher can be constructed which make such schemes very attractive. Moreover, in various embodiments of the present invention a frequency resolution equivalent to the ruler line width can be obtained by slowly scanning the repetition rate of the frequency ruler while detecting the modulation of the signal on each individual pixel of the detector array. For comb spacings (comb spacing of a frequency comb laser is equivalent to the laser repetition rate) larger than around 10 GHz, a two dimensional detector array is not required as individual comb lines can, for example, be resolved using two or more conventional diffraction gratings in series or multiple passes or reflections from a single grating. The use of a single-dimensional detector array generally reduces the cost of the detection system while increasing the acquisition speed. A comb spacing of 10 GHz can for example be obtained from a 1 GHz repetition rate source by the insertion of an appropriate Fabry-Perot filter cavity. Such repetition rate multiplication was for example discussed in T. Sizer in 'Increase in laser repetition rate by spectral selection', IEEE J. Quantum Electronics, vol. 25, pp. 97-103 (1989) and U.S. patent application Ser. No. 12/895,127 to Fermann et al. and is not further described here. A Vernier type enhancement cavity as for example discussed in U.S. Pat. No. 8,120,773 may also be used to increase the comb spacing.

Figure 8:
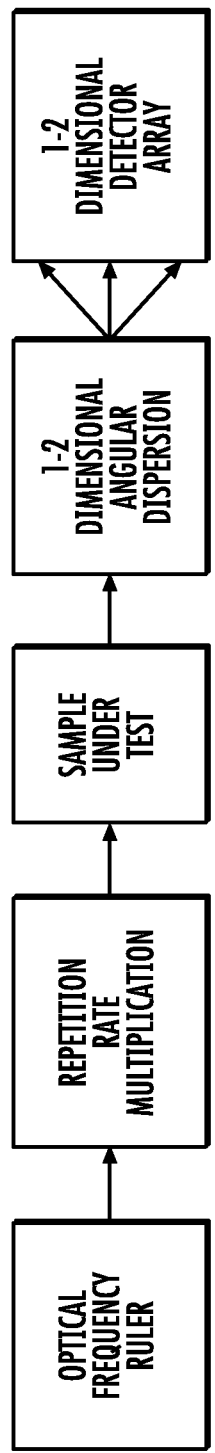
FIG. 8 schematically illustrates a frequency ruler in a system for direct comb spectroscopy according to an embodiment of the present invention.

A spectroscopy system including a repetition multiplication stage is further shown in FIG. 8. As discussed above, a frequency ruler is used as the input to the system and the repetition multiplication stage increases the comb spacing of the ruler to around 500 MHz or a few GHz. After signal transmission through the sample under test, the frequency ruler is then angularly dispersed in one or two dimensions and detected with a one or two dimensional detector array.

In addition the position of the comb lines can be slowly scanned and at the same time modulated at high frequencies in frequency space in order to enable broad band differential absorption spectroscopy on multiple absorption bands simultaneously. Such schemes are well known from single laser spectroscopy. Many other spectroscopic techniques can be adapted to broad band detection where the principle requirement is the optical resolution of individual comb lines.

Figure 9:
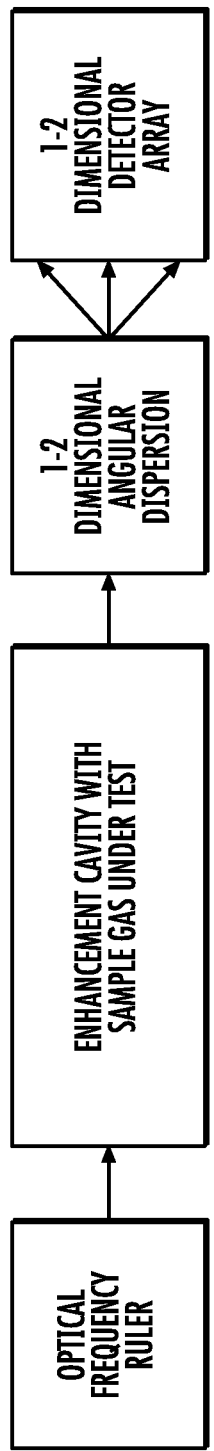
FIG. 9 schematically illustrates a frequency ruler in a system for cavity enhanced direct comb spectroscopy according to an embodiment of the present invention.

A particularly attractive scheme for broadband trace gas detection is based on cavity enhanced trace gas detection as disclosed in U.S. Patent Application No. 61/617,482, ('482), entitled 'Methods for precision optical frequency synthesis and molecular detection', filed Mar. 29, 2012, to Fermann et al. When combined with a frequency ruler with large frequency spacing, broadband detection of multiple gas species can be performed simultaneously using a slight modification of the scheme shown in FIG. 8 herein, as further described with respect to FIG. 9. Here a frequency ruler as described with respect to FIG. 3 can be implemented. The output of the frequency ruler is then coupled into a wide bandwidth enhancement cavity using electronic locking techniques, for example as discussed with respect to FIG. 3a in '482 which illustrates an embodiment for coupling a line narrowed cw laser to an external enhancement cavity for cavity ring down spectroscopy and an associated Pound Dreyer Hall locking (PDH) technique.

To facilitate coupling of a wide bandwidth signal into an enhancement cavity, the frequency ruler can be directed through an electro-optic modulator located in front of the enhancement cavity (not shown) and the reflected signal from the cavity can be directed via a beam-splitter onto a detector and mixed with the drive signal to the electro-optic modulator to generate a Pound Dreyer Hall (PDH) error signal. To obtain a large electronic locking bandwidth, serrodyne modulation of the electro-optic modulator as shown in Kohlhaas et al., "Robust laser frequency stabilization by serrodyne modulation", Opt. Lett., vol. 37, pp. 1005 (2012) can be implemented.

To faciliate locking of both the cavity mode spacing and the carrier envelope offset frequency of the ruler to the enhancement cavity, two different wavelengths within the output of the frequency ruler can be used to generate two PDH error signals. This is further described with respect to FIG. 3 of A. Foltynowicz et al., 'Optical frequency comb spectroscopy', Faraday Discussions, vol. 150, pp. 23-31, 2011 and not further discussed here. In at least one embodiment of the present invention a servo loop uses the first PDH error signal to lock the mode spacing of the enhancement cavity to the mode spacing of the frequency ruler using an appropriate PZT mounted enhancement cavity mirror. The second PDH error signal is then used to control the carrier envelope offset frequency of the pump laser.

However, alternative arrangements are also possible, for example the first PDH signal can also be used to adjust the cavity mode spacing of the frequency ruler to match it to the enhancement cavity. The second PDH signal in conjunction with the electro-optic modulator can also be used to frequency shift the frequency ruler for matching the carrier envelope offset frequency of the enhancement cavity without any need for stabilization of the carrier envelope offset frequency of the pump laser.

To resolve individual comb lines the output from the enhancement cavity is further dispersed in preferably two dimensions and detected with a detector array, allowing for direct observation of any absorption features in the enhancement cavity.

To further reduce the complexity of a broadband trace gas detection system, the enhancement cavity can further be substituted with a multi-pass gas cell such as a Herriott or White cell as well known in the state of the art.

Individual comb modes can further be resolved without the use of an angular dispersion element. For example the angular dispersion element in FIG. 8 and the detector array can be replaced with a conventional Fourier-transform spectrometer. Provided the Fourier transform spectrometer has a sufficient scan range, individual comb modes can be resolved also. Other means for spectrally resolving comb modes are also possible.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

In the present disclosure the term "or" is intended to mean an inclusive "or" rather than an exclusive "or". In addition, the articles "a" and "an" as used herein should generally be construed to mean "one or more" unless specified otherwise.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A frequency ruler, comprising,
a pump source comprising a mode locked laser, said pump source generating pump pulses at a pulse repetition rate $f_{rep}$ and characterized by having a pump carrier envelope offset frequency $f_{0p}$, said pump laser operably arranged to generate picosecond (ps) or femtosecond (fs) pulses at a constant repetition rate; and
a doubly-resonant non-degenerate optical parametric oscillator (DNOPO) receiving said pump pulses, wherein said ps or fs pulses are of sufficient power to start oscillation of the DNOPO,
said DNOPO producing as an output a frequency ruler spectrum comprising individual frequency modes, said frequency modes characterized by having: a frequency spacing which is an integer multiple of said repetition rate, and distinct ruler carrier envelope offset frequencies which exhibit at least one discontinuity as a function of frequency;
a controller operatively connected to said mode locked pump laser and said DNOPO, said controller arranged to receive a plurality of beat signals and to stabilize a carrier envelope offset frequency, $f_{0p}$, of said pump laser, stabilize a carrier envelope offset frequency, $f_{0s}$, of at least a signal output of said DNOPO, and lock a pump laser repetition rate.

2. The frequency ruler according to claim 1, wherein said discontinuity is adjustable by a change in intra-cavity dispersion within said DNOPO.

3. The frequency ruler according to claim 1, wherein said discontinuity is adjustable by a change in cavity length of said DNOPO.

4. The frequency ruler according to claim 1, wherein said discontinuity is adjustable by adjustment of the carrier envelope offset frequency of the pump laser.

5. The frequency ruler according to claim 1, wherein said discontinuity is adjustable by adjustment of the configuration of the DNOPO.

6. The frequency ruler according to claim 1, wherein said discontinuity is adjustable by a change in intra-cavity dispersion within said DNOPO.

7. The frequency ruler according to claim 1, wherein said discontinuity is adjustable by a change in repetition rate $f_{rep}$ of said pump source.

8. The frequency ruler according to claim 1, wherein said locking the repetition rate comprises: locking the repetition rate to a DNOPO round trip time.

9. The frequency ruler according to claim 1, said frequency ruler comprising: a feedback mechanism stabilizing the cavity length of said DNOPO, said feedback mechanism further resulting in DNOPO oscillation with stable carrier envelope offset frequencies.

10. The frequency ruler according to claim 9, wherein said stable carrier envelope offset frequencies exhibit fluctuations of less than 10% of said pump laser repetition rate.

11. A frequency ruler, comprising,
a pump source comprising a fiber-based frequency comb laser, said pump source generating pump pulses at a pulse repetition rate and characterized by having a pump carrier envelope offset frequency, $f_{op}$, said pump laser operably arranged to generate picosecond (ps) or femtosecond (fs) pulses at a constant repetition rate;
a doubly-resonant non-degenerate optical parametric oscillator (DNOPO) receiving pump pulses from said mode locked fiber comb laser of sufficient power to pump said DNOPO and generate signal and idler outputs characterized by having respective signal and idler carrier envelope offset frequencies $f_{0s}$ and $f_{0i}$, said DNOPO generating a frequency ruler spectrum at an output thereof; and
signal processing equipment operatively connected to at least said pump source and said DNOPO and arranged to receive said spectral information derived from said pump source and said DNOPO,
said signal processing equipment generating a plurality of signals to stabilize the repetition rate of said pump source and the cavity length of said DNOPO, and to further stabilize said pump carrier envelope offset frequency, $f_{op}$, thereby stabilizing said respective signal and idler carrier envelope offset frequencies, $f_{0s}$ and $f_{0i}$, of said DNOPO and said frequency ruler.

12. The frequency ruler according to claim 11, wherein said DNOPO comprises a nonlinear parametric crystal selected from PPLN, OPGaAs, OPGaP, AgGaSe or AgGaS.

13. The frequency ruler according to claim 11, wherein said frequency ruler is arranged as a portion of a spectroscopy system.

14. The frequency ruler according to claim 13, wherein said frequency ruler is transmitted through a multiple pass gas absorption cell of said spectroscopy system.

15. The frequency ruler according to claim 11, wherein said frequency ruler is arranged as a portion of a dual comb spectroscopy system.

16. The frequency ruler according to claim 15, wherein said signal processor is operatively connected to said pump source and said DNOPO, said signal processor arranged to output a signal to lock ruler carrier envelope offset frequencies to the carrier envelope offset frequency of said pump source.

17. The frequency ruler according to claim 11, said frequency ruler is arranged as a portion of a direct comb spectroscopy system.

18. The frequency ruler according to claim 11, wherein said frequency ruler is arranged as a portion of a Fourier transform spectroscopy system.

19. The frequency ruler according to claim 11, wherein said frequency ruler is arranged as a portion of a cavity enhanced spectroscopy system.

20. The frequency ruler according to claim 11, wherein said frequency ruler is further configured to allow the resolution of individual comb modes.

21. The frequency ruler according to claim 11, further comprising a supercontinuum generator (SC) optically connected to said pump source and receiving a portion of said pump pulses from said fiber-based frequency comb laser and generating a supercontinuum therewith.

22. The frequency ruler according to claim 11, further comprising a reference laser (RL) which generates a predetermined optical reference frequency.

23. The frequency ruler according to claim 11, further comprising an OPO stabilizer to synchronize a cavity length of said DNOPO to said pulse repetition rate of said pump pulses.

24. The frequency ruler according to claim 11, wherein said frequency ruler further comprises a supercontinuum generator (SC) and a reference laser (RL).

25. The frequency ruler according to claim 11, said frequency ruler comprising a feedback mechanism stabilizing the cavity length of said DNOPO, said feedback mechanism further resulting in DNOPO oscillation with stable carrier envelope offset frequencies.

26. The frequency ruler according to claim 25, wherein said stable carrier envelope offset frequencies exhibit fluctuations of less than 10% of said pump laser repetition rate.

27. A frequency ruler comprising, comprising
a mode-locked pump laser operably arranged to generate picosecond (ps) or femtosecond (fs) pulses at a constant repetition rate;
a doubly-resonant non-degenerate optical parametric oscillator (DNOPO);
a controller operatively connected to said mode locked pump laser and said DNOPO, said controller arranged to receive a plurality of beat signals and to perform at least three of the following functions therewith: stabilizing a carrier envelope offset frequency, $f_{0p}$, of said pump laser, stabilizing a carrier envelope offset frequency, $f_{0s}$, of at least a signal output of said DNOPO, and locking a pump laser repetition rate.

28. The frequency ruler comprising according to claim 27, said frequency ruler further comprising at least one of a supercontinuum generation stage or a cw reference laser.

29. The frequency ruler according to claim 28, wherein three beat signals are derived using said at least one supercontinuum generation stage and said at least one cw reference laser.

30. The frequency ruler according to claim 28, wherein said frequency ruler comprises a plurality of reference lasers, each of said plurality of reference lasers operatively connected to one or more of said mode locked pump laser, said DNOPO, or to said at least one supercontinuum generator, and arranged to generate a plurality of beat signals from which the frequency output spectrum of said DNOPO is characterized.

31. The frequency ruler according to claim 27, wherein said frequency ruler comprises at least one of a near IR or mid-IR supercontinuum generator said near IR or mid-IR supercontinuum generator configured to output signals from which respective carrier envelope offset frequencies $f_{0p}$, $f_{0s}$ of said mode locked pump laser and of said DNOPO are obtainable.

32. The frequency ruler according to claim 27, wherein a frequency output spectrum of said DNOPO is characterized with beat signals comprising $f_{0p}$, $f_{0s}$-$f_{0p}$, and a beat signal representative of said pump laser repetition rate.

33. The frequency ruler according to claim 27, wherein said locking the repetition rate comprises: locking the repetition rate to a DNOPO round trip time.

34. A frequency ruler, comprising,
a pump source comprising a mode locked laser, said pump source generating pump pulses at a pulse repetition rate $f_{rep}$ and characterized by having a pump carrier envelope offset frequency $f_{0p}$, said pump laser operably arranged to generate picosecond (ps) or femtosecond (fs) pulses at a constant repetition rate ; and
a doubly-resonant non-degenerate optical parametric oscillator (DNOPO) receiving said pump pulses, wherein said ps or fs pulses are of sufficient power to start oscillation of the DNOPO, said DNOPO producing as an output a frequency ruler spectrum comprising individual frequency modes, said frequency modes characterized by having: a frequency spacing which is an integer multiple of said repetition rate, and distinct ruler carrier envelope offset frequencies which exhibit at least one discontinuity as a function of frequency;
a controller operatively connected to said mode locked pump laser and said DNOPO, said controller operably arranged to lock a pump laser repetition rate and a DNOPO round trip time to each other.

35. The frequency ruler according to claim 34, said frequency ruler further comprising at least one of a supercontinuum generation stage or a cw reference laser.

* * * * *